US009098107B2

(12) United States Patent
Yasuda et al.

(10) Patent No.: US 9,098,107 B2
(45) Date of Patent: Aug. 4, 2015

(54) PROXIMITY DETERMINATION METHOD, PROXIMITY DETERMINATION DEVICE, AND PROXIMITY DETERMINATION SYSTEM

(71) Applicant: FUJITSU LIMITED, Kawasaki-shi, Kanagawa (JP)

(72) Inventors: Masaya Yasuda, Kawasaki (JP); Jun Yajima, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/048,899

(22) Filed: Oct. 8, 2013

(65) Prior Publication Data

US 2014/0136094 A1 May 15, 2014

(30) Foreign Application Priority Data

Nov. 12, 2012 (JP) ................................ 2012-248767

(51) Int. Cl.
*G06F 7/00* (2006.01)
*G08G 1/16* (2006.01)

(52) U.S. Cl.
CPC . *G06F 7/00* (2013.01); *G08G 1/166* (2013.01)

(58) Field of Classification Search
CPC .... H04K 1/02; H04N 1/8358; H04L 63/0428; H04L 9/003; G11B 20/00086
USPC ........................................................ 380/252
See application file for complete search history.

(56) References Cited

U.S. PATENT DOCUMENTS

| 6,587,782 | B1 * | 7/2003 | Nocek et al. ................... 701/438 |
| 7,164,986 | B2 * | 1/2007 | Humphries et al. .......... 701/517 |
| 7,305,365 | B1 * | 12/2007 | Bhela et al. ..................... 705/51 |
| 7,339,469 | B2 * | 3/2008 | Braun ...................... 340/539.13 |

(Continued)

FOREIGN PATENT DOCUMENTS

| JP | 11-338853 | 12/1999 |
| JP | 2007-166605 | 6/2007 |
| JP | 2010-45699 | 2/2010 |
| JP | 2010-243376 | 10/2010 |

OTHER PUBLICATIONS

Greenwell H., "OMA and Location Based Services", OMA Mobile Alliance, London, Sep. 3-4, 2008, 26 pages in total.*

(Continued)

*Primary Examiner* — Yonas Bayou
(74) *Attorney, Agent, or Firm* — Staas & Halsey LLP

(57) ABSTRACT

A proximity determination method includes: collecting a first concealed vector based on a linear combination of a row vector of a key matrix, first numerical information, and a first random number, the key matrix being generated by adding a random number vector as a last column to a matrix in which a threshold for determining a proximity range is a diagonal element; collecting a second concealed vector based on the linear combination, second numerical information, and a second random number; calculating a remainder vector, the remainder vector being a remainder obtained from a difference between the collected first concealed vector and the second concealed vector when the key matrix is used as a modulus; and determining whether the first numerical information and the second numerical information belong to the proximity range, based on the calculated remainder vector.

16 Claims, 10 Drawing Sheets

(56) References Cited

U.S. PATENT DOCUMENTS

| | | | |
|---|---|---|---|
| 8,019,532 B2* | 9/2011 | Sheha et al. | 701/420 |
| 2007/0162821 A1 | 7/2007 | Hwang et al. | |
| 2009/0043501 A1* | 2/2009 | Lohi et al. | 701/213 |
| 2009/0063047 A1* | 3/2009 | Ono | 701/211 |
| 2010/0039529 A1* | 2/2010 | Fujimaki et al. | 348/231.3 |
| 2010/0274569 A1* | 10/2010 | Reudink | 705/1.1 |
| 2010/0279706 A1* | 11/2010 | Dicke | 455/456.1 |
| 2012/0316989 A1* | 12/2012 | Wong et al. | 705/26.9 |
| 2013/0018714 A1* | 1/2013 | George | 705/14.16 |

OTHER PUBLICATIONS

Ku et al., "Location-based Spatial Queries with Data Sharing in Mobile Environments", University of Southern California, http://citeseerx.ist.psu.edu/viewdoc/summary?doi=10.1.99.43, 22 pages in total, Jul. 6, 2005.*

S. Jun et al., "Privacy-Preserving Data Mining," Transactions of the Japanese Society for Artificial Intelligence, vol. 24, No. 2, Mar. 2009, pp. 1-11.

* cited by examiner

PROXIMITY DETERMINATION METHOD, PROXIMITY DETERMINATION DEVICE, AND PROXIMITY DETERMINATION SYSTEM

CROSS-REFERENCE TO RELATED APPLICATION

This application is based upon and claims the benefit of priority of the prior Japanese Patent Application No. 2012-248767, filed on Nov. 12, 2012, the entire contents of which are incorporated herein by reference.

FIELD

The embodiments discussed herein are related to technologies for determining the proximity between pieces of information.

BACKGROUND

Technologies of cloud computing that provide users with various services using computing resources existing on networks have recently been used. One example of such cloud computing technologies could be a technology in which an information processing device on a network collects various numerical information associated with a user, such as position information and biometric information, and provides the user with services in accordance with a comparison result and an analysis result of the collected numerical information. For example, there may be a technology in which an information processing device on a network collects and compares position information on a user and taxi vehicles, and provides the user with information on a taxi vehicle located in proximity to the user.

As such, when an information processing device collects and analyzes numerical information associated with a user, it is possible to provide services regardless of computing resources on the user's side. This improves convenience for the user. When an information processing device on a network collects numerical information associated with a user, however, it is preferable from the viewpoint of security that the numerical information be concealed so as not to leak to a third party. As the technology for concealing numerical information associated with a user, a concealment technology using masking is known.

For example, a terminal device used by a user and a terminal device mounted in a taxi vehicle conceal numerical information indicating the current locations using a predetermined mask value and send the concealed numerical information to an information processing device on a network. Then, the information processing device on a network collects the pieces of concealed numerical information from the user and the taxi vehicle and compares the pieces of collected numerical information with each other, thereby determining the proximity between the user and the taxi vehicle. Note that "Privacy-preserving Data Mining" Jun Sakuma, Interdisciplinary Graduate school of Science and Engineering, Tokyo Institute of Technology, Shigenobu Kobayashi, Interdisciplinary Graduate school of Science and Engineering and Tokyo Institute of Technology, for example, discloses the determining method concerned.

SUMMARY

According to an aspect of the invention, a proximity determination method that is executed by a computer, the proximity determination method includes: collecting a first concealed vector based on a linear combination of a row vector of a key matrix, first numerical information, and a first random number, the key matrix being generated by adding a random number vector as a last column to a matrix in which a threshold for determining a proximity range is a diagonal element; collecting a second concealed vector based on the linear combination, second numerical information, and a second random number; calculating a remainder vector, the remainder vector being a remainder obtained from a difference between the collected first concealed vector and the second concealed vector when the key matrix is used as a modulus; and determining whether the first numerical information and the second numerical information belong to the proximity range, based on the calculated remainder vector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the masking technology described above, the proximity is determined using concealed numerical information, and, for this reason, each piece of numerical information is concealed by using a mask value shared by all the pieces of numerical information. There is, therefore, a problem in that a user's numerical information is likely to leak out to other users.

One aspect of technologies disclosed in the present embodiments is directed to providing a method, a device, and a system capable of determining the proximity of numerical information, which is kept concealed, to another numerical information.

Embodiments will be described below with reference to the accompanying drawings.

First Embodiment

Figure 1:
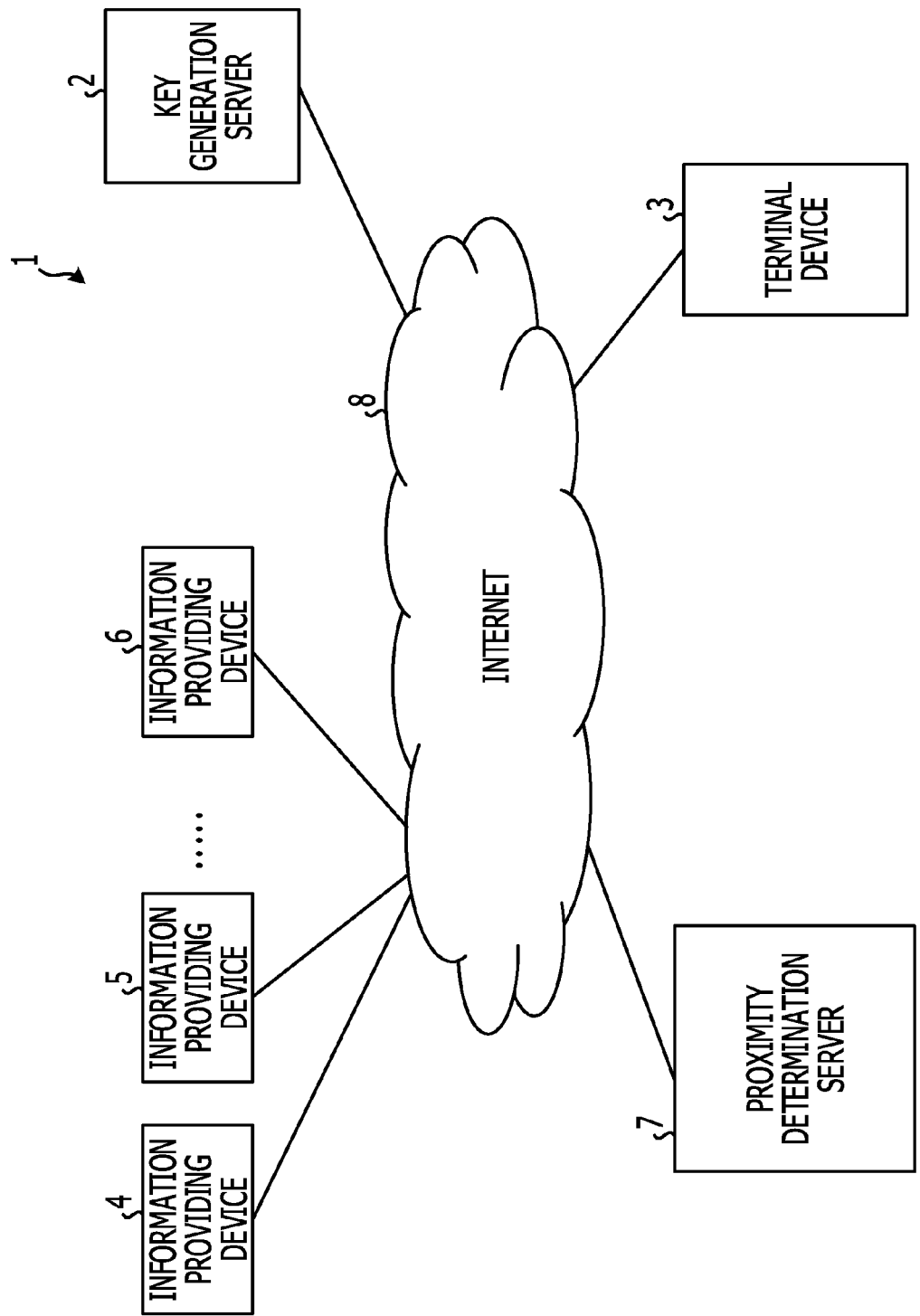
FIG. 1 is a block diagram illustrating an example of a proximity determination system according to a first embodiment.

In a first embodiment described below, with reference to FIG. 1, an example of a proximity determination system will be described. FIG. 1 is a block diagram illustrating an example of a proximity determination system according to the first embodiment. In the example illustrated in FIG. 1, a key generation server 2, a terminal device 3, a plurality of information providing devices 4 to 6, and a proximity determination server 7, of a proximity determination system 1, are connected through the Internet 8. In FIG. 1, the proximity determination system 1 may further include a plurality of information providing devices and also may further include a plurality of terminal devices 3, which are not illustrated for the ease of understanding.

The proximity determination system 1 determines the proximity of numerical information associated with the information providing devices 4 to 6 and numerical information associated with the terminal device 3. Note that although the proximity determination system 1 is capable of handling arbitrary numerical information as the numerical information of each of the information providing devices 4 to 6 and the terminal device 3, an example in which position information, which is numerical information indicating the positions of the terminal device 3 and each of the information providing devices 4 to 6, is handled will be described below.

The terminal device 3 is a terminal device that a user of the proximity determination system 1 has, and is a terminal capable of acquiring the user's position information using a global positioning system (GPS), Galileo, or another arbitrary system. Each of the information providing devices 4 to 6 is an information processing device mounted in a taxi vehicle, and is a terminal capable of acquiring the user's position information using an arbitrary system, as is the case in the terminal device 3.

When searching for a taxi vehicle located in proximity to the user, the terminal device 3 makes a request for a search for a taxi vehicle through the Internet 8 to the proximity determination server 7. Then, the terminal device 3 conceals his or her position information and sends the concealed position information to the proximity determination server 7. Note that each of the information providing devices 4 to 6 sends concealed position information to the proximity determination server 7 at regular intervals or in response to a request from the proximity determination server 7.

The proximity determination server 7 collects position information acquired by the terminal device 3 and each of the information providing devices 4 to 6, and carries out a proximity determination for the collected position information. For example, in response to a request from the terminal device 3, the proximity determination server 7 collects concealed position information from the terminal device 3 and each of the information providing devices 4 to 6, and carries out a proximity determination for determining whether the positions indicated by the collected position information are within a predetermined proximity range.

Then, the proximity determination server 7 notifies the terminal device 3 of an information providing device located in proximity to the terminal device 3, as the result of the proximity determination, thereby allowing a user to be notified of a taxi vehicle located in proximity to the user. Note that the proximity determination server 7 may notify an information providing device located in proximity to the terminal device 3 of the position of the terminal device 3 so that the taxi vehicle is notified of the position of the user.

Here, if the proximity determination system 1 receives position information concealed with a mask value shared by the terminal device 3 and each of the information providing devices 4 to 6 at the time of collecting position information from the terminal device 3 and each of the information providing devices 4 to 6, it is impossible to conceal the position information of the terminal device 3 or each of the information providing devices 4 to 6 from the other users. For example, the information providing device 4 has a mask value in common with the terminal device 3. Therefore, upon acquiring position information concealed by the terminal device 3, the information providing device 4 is able to read the position information of the terminal device 3 from the acquired concealed information.

For this reason, in the proximity determination system 1, the terminal device 3 and each of the information providing devices 4 to 6 conceal position information using their respectively different random numbers, and send the concealed position information to the proximity determination server 7. Concealing of position information in the proximity determination system 1 and the content of a proximity determination for the concealed position information will be described below. Note that, in the below description, the content of a proximity determination is described using arbitrary natural numbers m and n that satisfy m+1=n.

For example, the key generation server 2 generates a diagonal matrix in which thresholds indicating a proximity range are diagonal elements, and the other elements are equal to zero. Here, the thresholds indicating the proximity range are numerical values representing a region set as a proximity range by a user, and are information indicating the lengths in all dimensions of the proximity range. Note that the key generation server 2 generates an m×m diagonal matrix in the case where position information for which a determination is to be carried out is information having m elements, that is, in the case where the position information is m-dimensional information. Then, the key generation server 2 generates an n×m matrix in which the last row with all the elements equal to zero is added to the generated m×m diagonal matrix.

The key generation server 2 generates a random number vector having elements the number of which is a number obtained by incrementing the number m of rows of the diagonal matrix by one. Then, the key generation server 2 adds the generated random number vector as the last column, that is, the (m+1=n)th column to the generated n×m matrix, thereby generating an n×n square matrix as a key matrix. Note that the key generation server 2 generates a random number vector so that each element of the random number vector added to the diagonal matrix is equal to or less than half of the corresponding element of the diagonal matrix included in the same row. The key generation server 2 assigns a suitable random number to the last element of the random number vector.

Then, the key generation server 2 generates a plurality of linear combinations of the generated key matrix. For example, the key matrix, which is an n×n square matrix, is able to be expressed by a matrix in which row vectors $v_1$, $v_2$, ..., $v_n$, each of which has n elements, are column elements. The key generation server 2 selects integers $d_1$, $d_2$, ..., $d_n$ that are respectively suitable for the row vectors $v_1$, $v_2$, ..., $v_n$, and calculates the sum of the products each obtained by multiplying a row vector by the corresponding integer, that is, an n-dimensional vector expressed as $d_1{*}v_1 + d_2{*}v_2 + ... + d_n{*}v_n$, as a linear combination.

Note that the key generation server 2 selects a group of integers $d_1, d_2, ..., d_n$ that differs for every piece of position information sent from the terminal device 3 or each of the information providing devices 4 to 6, and calculates a linear combination that is the sum of the products of multiplication of the selected group of integers by row vectors of the key matrix. Then, the key generation server 2 distributes the calculated linear combinations to the terminal device 3 and each of the information providing devices 4 to 6. The key generation server 2 also sends the generated key matrix to the proximity determination server 7.

In such a case, the terminal device 3 generates a position vector by adding "0", which is the nth element, to m-dimensional elements that the position information has, and generates a concealed vector by adding the generated position vector to the product of the linear combination received from the key generation server 2 and a random number. Then, the terminal device 3 sends the generated concealed vector to the proximity determination server 7.

Also, each of the information providing devices 4 to 6, as in the case of the terminal device 3, generates a position vector whose elements are position information, and a concealed vector in which the generated position vector is added to the product of the linear combination received from the key generation server 2 and a random number. Then, each of the information providing devices 4 to 6 sends the generated concealed vector to the proximity determination server 7.

In contrast, the proximity determination server 7 calculates each difference vector between the concealed vector received from the terminal device 3 and the concealed vector received from each of the information providing devices 4 to 6. Then, the proximity determination server 7 calculates a remainder vector, which is a remainder obtained from the calculated difference vector when a key matrix received from the key generation server 2 is used as a modulus, and carries out a proximity determination using the calculated remainder vector.

For example, when the last element of the remainder vector, which is a remainder obtained from a difference between a concealed vector received from the terminal device 3 and a concealed vector received from the information providing device 4 when a key matrix is used as a modulus, is "0", the proximity determination server 7 determines that the terminal device 3 and the information providing device 4 are located in proximity to each other. Then, the proximity determination server 7 notifies the terminal device 3 of information on the information providing device 4.

In this way, the proximity determination server 7 carries out proximity determinations using position information concealed with random numbers that differ from one another from the terminal device 3 and each of the information providing devices 4 to 6. For this reason, the proximity determination system 1 may inhibit position information from leaking out even when concealed vectors sent by the terminal device 3 and the information providing devices 4 to 6 are acquired by other terminal devices and information providing devices. That is, in the proximity determination system 1, since position information is concealed with random numbers that differ from one another, it is impossible for one device to read position information from a concealed vector generated by another device. The leakage of position information may thus be inhibited.

Additionally, the terminal device 3 and the information providing devices 4 to 6 each send, to the proximity determination server 7, a concealed vector in which a position vector is added to the product of the linear combination of a key matrix and a random number. Then, the proximity determination server 7 calculates a remainder vector, which is a remainder obtained from a difference between concealed vectors when a key matrix is used as a modulus, and carries out a proximity determination based on the calculated remainder vector. For this reason, the proximity determination server 7 is able to carry out a proximity determination using position information that is concealed using different random numbers.

Note that, for example, when the terminal device 3 requests the proximity determination server 7 to carry out a proximity determination, the key generation server 2 may distribute linear combinations to the terminal device 3 and each of the information providing devices 4 to 6. The key generation server 2 may also distribute linear combinations only to the terminal device 3 and the information providing devices 4 to 6 that have requested the distribution of the linear combinations.

The principle of the proximity determination carried out by the proximity determination server 7 will be described below. The linear combinations of row vectors $v_1, v_2, \ldots, v_n$ of a key matrix V are able to be expressed as a set L (grid L). Each element of the set L is the linear combination $d_1*v_1+d_2*v_2+\ldots+d_n*v_n$ of row vectors of the key matrix V. That is, the linear combination of row vectors of the key matrix V corresponds to some intersection point on the grid of elements of the set L.

Here, a concealed vector $c_1$ obtained by concealing m-dimensional position information $a_1$ with an element $b_1$ of the set L and a random number $r_1$ is able to be expressed as $c_1=[a_1, 0]+r_1*b_1$, where $[a_1, 0]$ is a position vector obtained by adding the nth element "0" to the position information $a_1$. Also, a concealed vector $c_2$ obtained by concealing m-dimensional position information $a_2$ with an element $b_2$ of the set L and a random number $r_2$ is able to be expressed as $c_2=[a_2, 0]+r_2*b_2$. In such a case, a difference vector z between the concealed vectors $c_1$ and $c_2$ is able to be expressed as $z=c_1-c_2=[a_1, 0]+r_1*b_1-[a_2, 0]-r_2*b_2=[a_1-a_2, 0]+r_1*b_1-r_2*b_2$.

Here, $r_1*b_1-r_2*b_2$ included in the difference vector z is the difference between the products of elements of the set L and random numbers, and therefore is included in elements of the set L. That is, $r_1*b_1-r_2*b_2$ corresponds to one intersection point on the grid of elements of the set L. In the case where the remainder vector with the key matrix V is calculated from the difference vector z, this calculation corresponds to mapping of the difference vector z to the basic region P (L) determined by the set L. For this reason, in the case where the remainder vector with the key matrix V is calculated from the difference vector z, $r_1*b_1-r_2*b_2$ will be neglected. Therefore, when z mod V is calculated, grid portions including portions, other than the head, of the difference vector z will be neglected, and only one grid portion including the head of the difference vector z will be mapped to the basic region P (L).

As a result, z mod V=$[a_1-a_2, 0]$ mod V, and therefore z mod V=$[a_1-a_2, 0]$ when a vector $[a_1-a_2, 0]$ is included in the basic region P (L), that is, when the position information $a_1$ and the position information $a_2$ are included in the proximity range. As a result, when the position information $a_1$ and the position information $a_2$ are included in the proximity range, the last element of z mod V is "0" with a very high probability.

In contrast, when the vector $[a_1-a_2, 0]$ is not included in the basic region P (L), that is, when the position information $a_1$ and the position information $a_2$ are not included in the proximity range, z mod V=$[a_1-a_2, 0]+b$, where b is some element on the grid of the set L. As a result, when the position information $a_1$ and the position information $a_2$ are not included in the proximity range, the last element of z mod V has a value other than "0" with a very high probability. Based on such a principle, the proximity determination server 7 is able to calculate the remainder vector, with a key matrix, from a difference between concealed vectors and carry out a proximity determination for pieces of position information concealed with different random numbers, based on the last element of the calculated remainder vector.

Figure 2:
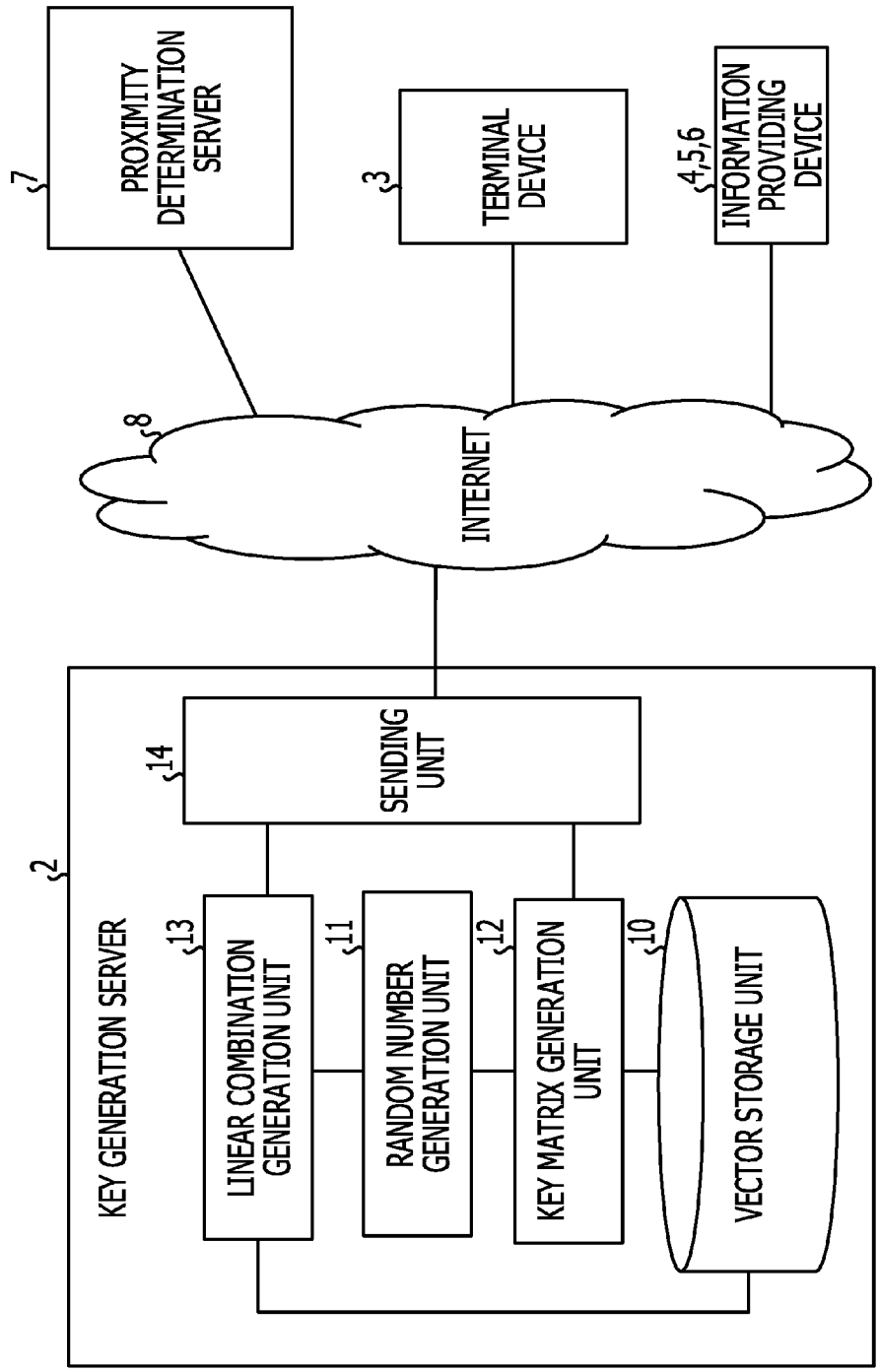
FIG. 2 is a block diagram illustrating a functional configuration of a key generation server according to the first embodiment.

With reference to FIG. 2, the functional configuration of a key generation server will be described next. FIG. 2 is a block diagram illustrating the functional configuration of a key generation server according to the first embodiment. The key generation server 2 includes a vector storage unit 10, a random number generation unit 11, a key matrix generation unit 12, a linear combination generation unit 13, and a sending unit 14. The vector storage unit 10 stores row vectors of a key matrix generated by the key matrix generation unit 12.

When requested by the key matrix generation unit 12 to generate random numbers for a key matrix, the random number generation unit 11 generates random numbers for the key matrix and outputs the generated random numbers to the key matrix generation unit 12. Here, the random numbers for a key matrix are random numbers to be added as the last column to a square matrix indicating thresholds at the time of generating the key matrix. For example, when requested to generate random numbers for a key matrix and notified of thresholds e, f, g included in the key matrix, the random number generation unit 11 generates random numbers h, i, j that satisfy $e/2 \geq h$, $f/2 \geq i$, and $g/2 \geq j$, and an arbitrary random number k. Then, the random number generation unit 11 notifies the key matrix generation unit 12 of the random number vector h, i, j, k.

When requested by the linear combination generation unit 13 to generate a plurality of groups of random numbers for linear combinations, the random number generation unit 11 generates a plurality of groups of random numbers in such a manner that the number of groups of random numbers is equal to the number of columns of the key matrix, and notifies the linear combination generation unit 13 of the groups of generated random numbers.

The key matrix generation unit 12 generates a key matrix for carrying out a proximity determination. In particular, the key matrix generation unit 12 generates a diagonal matrix that includes, as diagonal elements, thresholds indicating the proximity range determined in advance. Then, the key matrix generation unit 12 notifies the random number generation unit 11 of the diagonal elements and requests the random number generation unit 11 to generate random numbers for a key matrix.

Then, the key matrix generation unit 12 generates a key matrix by adding the last row with all elements of zero to the diagonal matrix and adding random numbers received from the random number generation unit 11 as the column vector to the last column of the diagonal matrix. Thereafter, the key matrix generation unit 12 instructs the sending unit 14 to send the generated key matrix to the proximity determination server 7. Also, the key matrix generation unit 12 stores each row vector of the generated key matrix in the vector storage unit 10.

Figure 3:
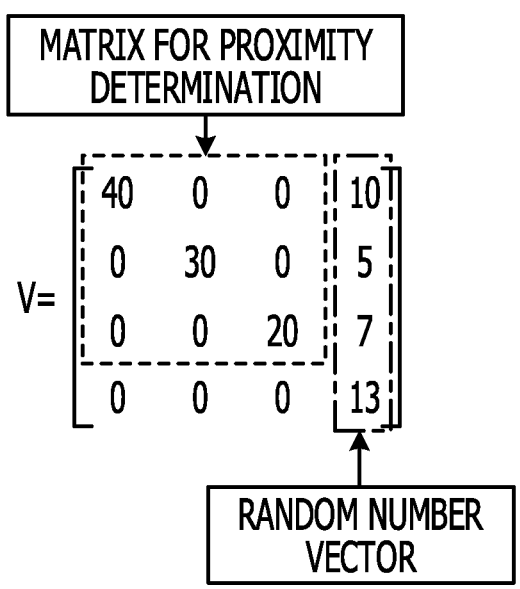
FIG. 3 illustrates a key matrix according to the first embodiment.

Here, FIG. 3 illustrates a key matrix according to the first embodiment. Note that, in the example of FIG. 3, the position information and the proximity range indicated by three-dimensional numerical values are illustrated. As illustrated in FIG. 3, the key matrix V is a matrix in which a random number vector is added as the last column to a matrix for proximity determination in the range denoted by a dotted line.

Here, the matrix for proximity determination has, as diagonal elements, thresholds specifying the lengths in all dimensions of the proximity range. For example, the example illustrated in FIG. 3 indicates that the length in the x-axis direction of the proximity range is "40", the length in the y-axis direction is "30", and the length in the z-axis direction is "20". That is, the matrix for proximity determination illustrated in FIG. 3 is a matrix for determining whether two pieces of position information are included in a range of "±20" in the x-axis direction, "±15" in the y-axis direction, and "±10" in the z-axis direction around an arbitrary center point.

Each element of the random number vector is selected so as to have a value equal to or less than half of the corresponding threshold included in the same row. For example, in the example illustrated in FIG. 3, "10, 5, and 7" are selected for the first three elements of the random number vector. Note that since a threshold is not included in the same row as the last element of the random number vector, an arbitrary random number is selected as the last element. Note that although the proximity range is specified by three-dimensional numerical values in the example illustrated in FIG. 3, the embodiment is not limited to this and may use numerical values of arbitrary dimensions. For example, the key generation server 2 may use the latitude, longitude, altitude, time, and so on in arbitrary combinations.

Referring back to FIG. 2, the linear combination generation unit 13 generates the linear combinations of row vectors of a key matrix and distributes the generated linear combinations to the terminal device 3 and each of the information providing devices 4 to 6. For example, the linear combination generation unit 13 acquires each row vector $v_1, v_2, \ldots, v_n$ stored in the vector storage unit 10. The linear combination generation unit 13 also instructs the random number generation unit 11 to generate a group of random numbers.

Then, upon receiving a group of random numbers $d_1, d_2, \ldots, d_n$ from the random number generation unit 11, the linear combination generation unit 13 calculates a linear combination $d_1*v_1+d_2*v_2+\ldots+d_n*v_n$. The linear combination generation unit 13 also requests the random number generation unit 11 for groups of random numbers in such a manner that the number of the groups is equal to the number of linear combinations to be distributed, and generates a linear combination for each group. Then, the linear combination generation unit 13 instructs the sending unit 14 to output a plurality of generated linear combinations to the terminal device 3 and each of the information providing devices 4 to 6.

Upon receiving a key matrix from the key matrix generation unit 12, the sending unit 14 sends the key matrix through the Internet 8 to the proximity determination server 7. Also, upon receiving a plurality of linear combinations from the linear combination generation unit 13, the sending unit 14 distributes linear combinations that differ from one another to the terminal device 3 and each of the information providing devices 4 to 6.

Note that the process in which the key generation server 2 generates a key matrix and linear combinations and the process in which the key generation server 2 distributes them may be performed at arbitrary timings. For example, the key generation server 2 generates new key matrices at predetermined time intervals, and sends the generated key matrices to the proximity determination server 7. Notification from the proximity determination server 7 of receipt of a request for proximity determination from the terminal device 3 may trigger the key generation server 2 to generate linear combinations and distribute the generated linear combinations to the terminal device 3 and each of the information providing devices 4 to 6. The key generation server 2 may also generate key matrices and linear combinations at predetermined time intervals, and send the generated key matrices to the proximity determination server 7 and distribute the linear combinations to the terminal device 3 and each of the information providing devices 4 to 6.

Figure 4:
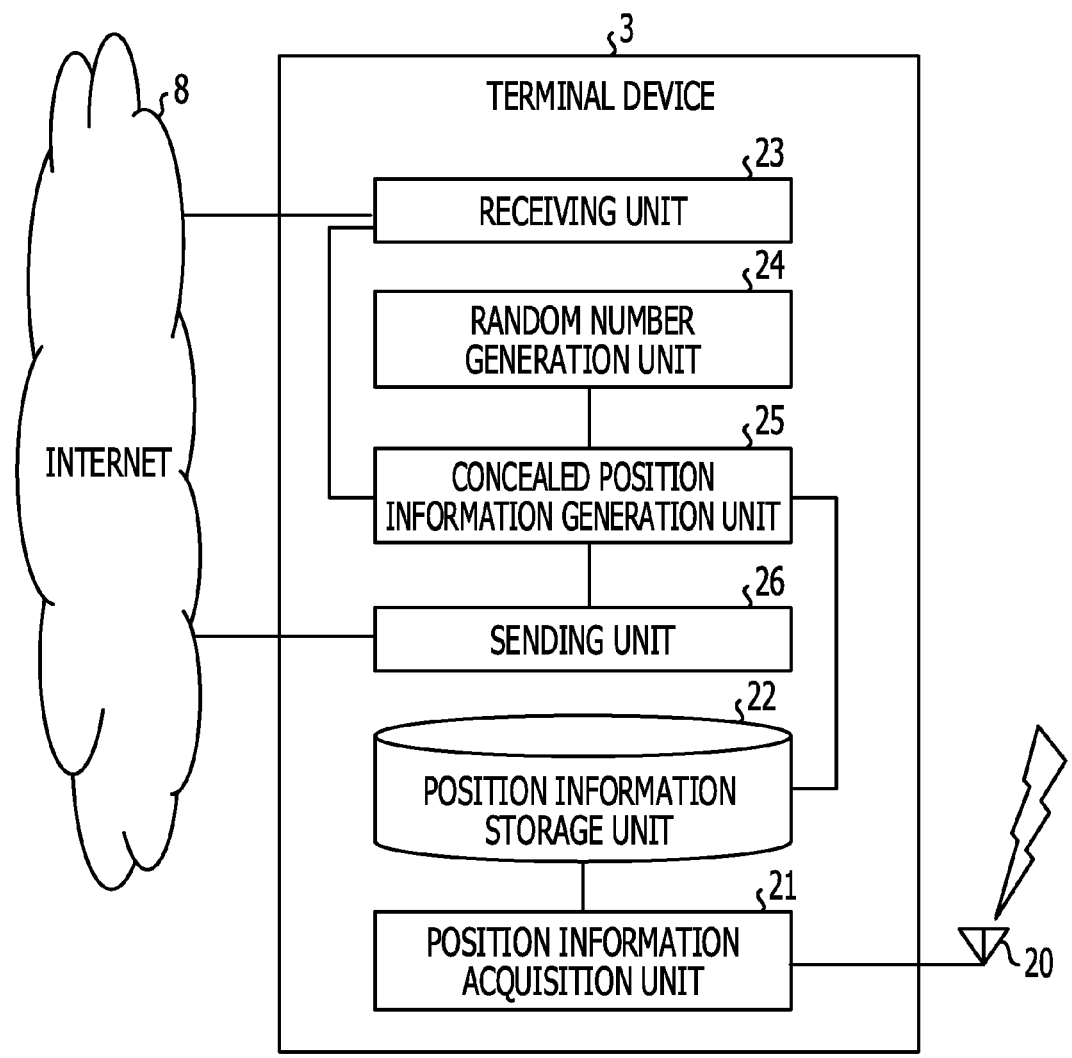
FIG. 4 is a block diagram illustrating a functional configuration of a terminal device according to the first embodiment.

With reference to FIG. 4, the functional configuration of the terminal device 3 will be described next. FIG. 4 is a block diagram illustrating the functional configuration of a terminal device according to the first embodiment. Note that, in the description given below, assuming that the information providing devices 5 and 6 exhibit the same functions as the information providing device 4, description thereof is omitted.

In the example illustrated in FIG. 4, the terminal device 3 includes a GPS antenna 20, a position information acquisition unit 21, a position information storage unit 22, a receiving unit 23, a random number generation unit 24, a concealed position information generation unit 25, and a sending unit 26. For example, the GPS antenna 20 receives signals output by satellites of a GPS, and outputs the received signals to the position information acquisition unit 21.

The position information acquisition unit 21 acquires the position information of the terminal device 3 from each signal received by the GPS antenna 20, and stores the acquired information in the position information storage unit 22. Note that, when using information, such as time, other than the position information for proximity determination, the position information acquisition unit 21 outputs the position information together with the acquired information, such as time, to the position information storage unit 22. It is unnecessary for the position information acquisition unit 21 to acquire the position of the terminal device 3 at all times. The position information acquisition unit 21 may acquire position information at predetermined time intervals and may also carry out acquisition at a time point of requesting the proximity determination server 7 to carry out a proximity determination. The position information storage unit 22 is a storage device for storing the position information of the terminal device 3 and, for example, is a semiconductor memory, such as a flash memory.

The receiving unit 23 receives a linear combination through the Internet 8 from the key generation server 2. Then, the receiving unit 23 outputs the linear combination received from the key generation server 2 to the concealed position information generation unit 25. When requested by the concealed position information generation unit 25 to generate a random number, the random number generation unit 24 generates an arbitrary random number, and outputs the generated random number to the concealed position information generation unit 25. Note that, with regard to the approach in which the random number generation unit 24 generates a random number, although any approach may be used, it is desired that various parameters differ from those of each of the information providing devices 4 to 6 so that the generated random number does not overlap the random number generated by each of the information providing devices 4 to 6.

Upon receiving a linear combination from the receiving unit 23, the concealed position information generation unit 25 instructs the random number generation unit 24 to generate a random number, and acquires the random number. Also, the concealed position information generation unit 25 acquires the position information of the terminal device 3 from the position information storage unit 22. Then, the concealed position information generation unit 25 generates a position vector from the position information, and generates a concealed vector in which the position vector is added to the product of the linear combination and the random number. Thereafter, the concealed position information generation unit 25 instructs the sending unit 26 to send the generated concealed vector to the proximity determination server 7.

For example, the concealed position information generation unit 25 receives an n-dimensional linear combination $d_1*v_1+d_2*v_2+ \ldots +d_n*v_n$, and acquires a random number $r_1$ from the random number generation unit 24. Also, the concealed position information generation unit 25 generates an n-dimensional position vector $[a_1, 0]$ having a last element of zero from position information $a_1$ stored in the position information storage unit 22. Then, the concealed position information generation unit 25 generates a concealed vector $c_1$ expressed by $c_1=[a_1, 0]+r_1*b_1$, and instructs the sending unit 26 to send the generated concealed vector $c_1$ to the proximity determination server 7.

Upon receiving a concealed vector from the concealed position information generation unit 25, the sending unit 26 sends the received concealed vector to the proximity determination server 7. Note that, when requested from an application or the like, which is not illustrated, to make a request for proximity determination, the sending unit 26 sends a request for proximity determination to the proximity determination server 7. In such a case, the key generation server 2 is notified of something to the effect that a proximity determination has been requested by the proximity determination server 7, and a linear combination for the terminal device 3 will be distributed from the key generation server 2.

Upon receiving the result of a proximity determination though the Internet 8 from the proximity determination server 7, the receiving unit 23 notifies the application or the like, which is not illustrated, of the result of the proximity determination. As a result, the terminal device 3 will display a taxi vehicle located in the proximity, as the result of the proximity determination, to the user.

Figure 5:
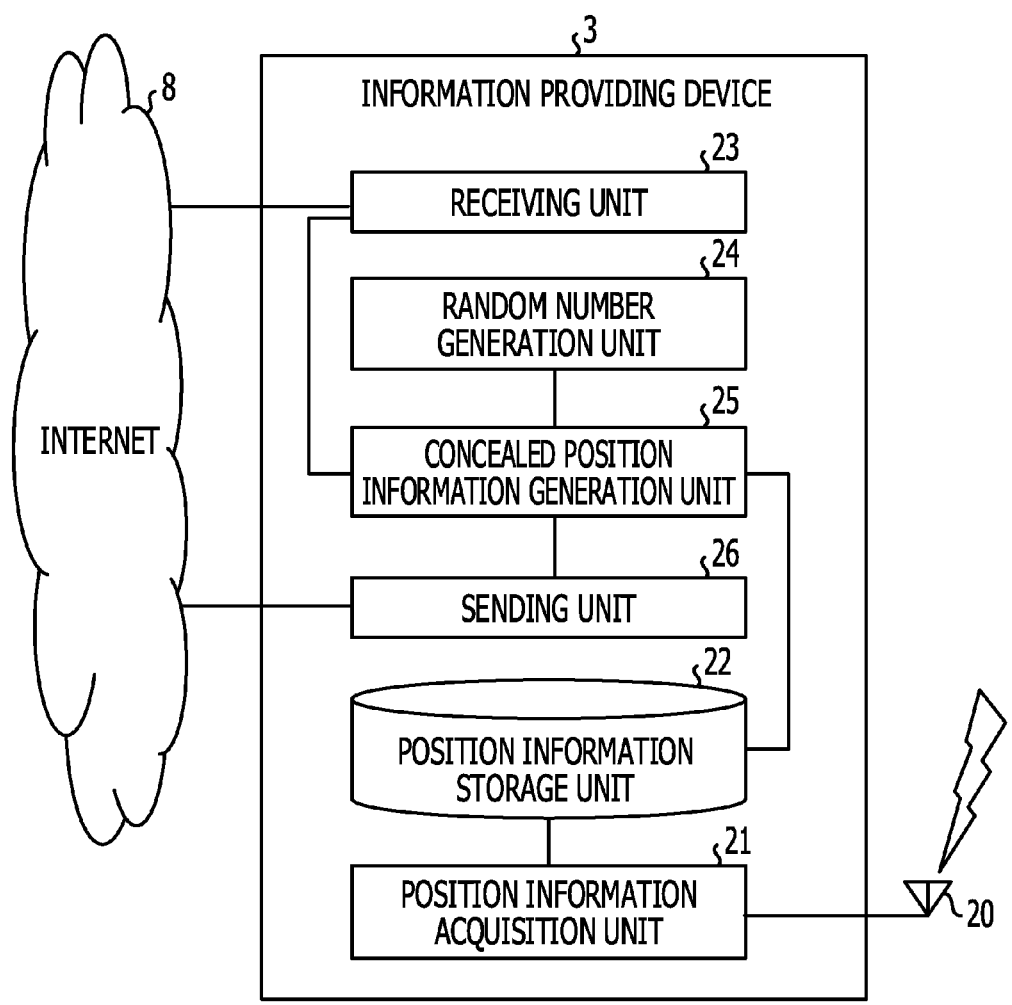
FIG. 5 is a block diagram illustrating a functional configuration of an information providing device according to the first embodiment.

With reference to FIG. 5, the functional configuration of the information providing device 4 will be described next. Note that, in the description given below, assuming that the information providing devices 5 and 6 exhibit the same functions as the information providing device 4, description thereof is omitted. Also, as illustrated in FIG. 5, the information providing device 4 exhibits functions similar to those of the terminal device 3 and therefore has a functional configuration similar to that of the terminal device 3.

For example, as illustrated in FIG. 5, the information providing device 4 includes a GPS antenna 30, a position information acquisition unit 31, a position information storage unit 32, a receiving unit 33, a random number generation unit 34, a concealed position information generation unit 35, and a sending unit 36. Like the GPS antenna 20, the GPS antenna 30 receives signals output by satellites of a GPS, and outputs the received signals to the position information acquisition unit 31.

Like the position information acquisition unit 21, the position information acquisition unit 31 acquires the position information of the information providing device 4 from each signal received by the GPS antenna 30, and stores the acquired information in the position information storage unit 32. Like the position information storage unit 22, the position information storage unit 32 is a storage device for storing the position information of the information providing device 4, and, for example, is a semiconductor memory, such as a flash memory.

Like the receiving unit 23, the receiving unit 33 receives a linear combination through the Internet 8 from the key generation server 2, and outputs the received linear combination to the concealed position information generation unit 35. Like the random number generation unit 24, when requested by the concealed position information generation unit 35 to generate a random number, the random number generation unit 34 generates an arbitrary random number, and outputs the generated random number to the concealed position information generation unit 35.

Like the concealed position information generation unit 25, the concealed position information generation unit 35 generates a concealed vector using the linear combination received by the receiving unit 33, the random number generated by the random number generation unit 34, and the position vector generated from the position information of the information providing device 4. Then, the concealed position information generation unit 35 outputs the concealed vector to the sending unit 36 so as to send it to the proximity determination server 7. Also, like the sending unit 26, the sending unit 36 sends the concealed vector, which has been received from the concealed position information generation unit 35, through the Internet 8 to the proximity determination server 7.

Figure 6:
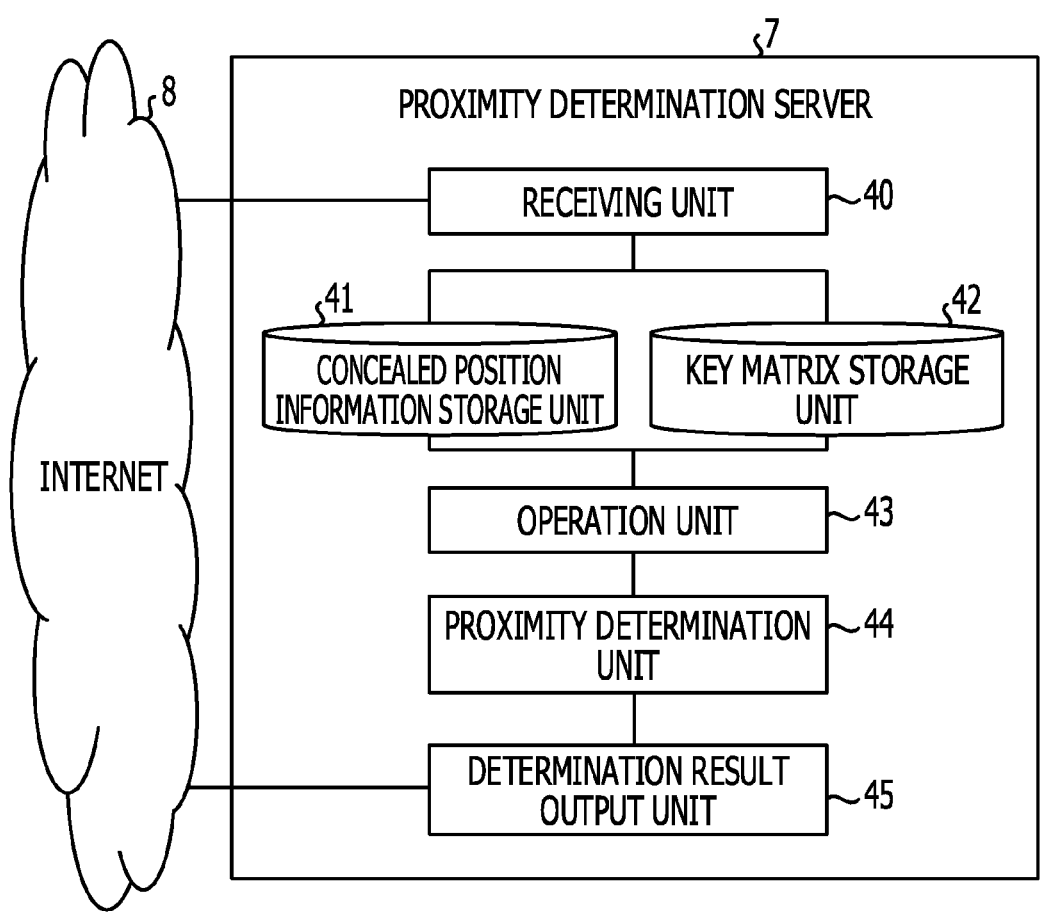
FIG. 6 is a block diagram illustrating a functional configuration of a proximity determination server according to the first embodiment.

With reference to FIG. 6, the functional configuration of the proximity determination server 7 will be described next. FIG. 6 is a block diagram illustrating the functional configuration of a proximity determination server according to the first embodiment. In the example illustrated in FIG. 6, the proximity determination server 7 includes a receiving unit 40, a concealed position information storage unit 41, a key matrix storage unit 42, an operation unit 43, a proximity determination unit 44, and a determination result output unit 45. Note that the concealed position information storage unit 41 is a storage device for storing concealed vectors received from the terminal device 3 and each of the information providing devices 4 to 6, and, for example, is a semiconductor memory, such as a flash memory. Also, the key matrix storage unit 42 is a storage device for storing key matrices received from the key generation server 2, and, for example, is a semiconductor memory, such as a flash memory.

Upon receiving a key matrix through the Internet 8 from the key generation server 2, the receiving unit 40 stores the received key matrix in the key matrix storage unit 42. Also, upon receiving concealed vectors through the Internet 8 from the terminal device 3 and each of the information providing devices 4 to 6, the receiving unit 40 associates the received concealed vectors with information indicating the sending sources and stores them in the concealed position information storage unit 41.

When concealed vectors of the terminal device 3 and each of the information providing devices 4 to 6 are stored in the concealed position information storage unit 41, the operation unit 43 performs a process described below. First, the operation unit 43 acquires the concealed vector from the concealed position information storage unit 41, and acquires a key matrix from the key matrix storage unit 42. Then, the operation unit 43 calculates a difference vector z between the concealed vector received from the terminal device 3 and concealed vector received from each of the information providing devices 4 to 6.

Then, the operation unit 43 calculates a remainder vector, which is a remainder obtained from the calculated difference vector z when a key matrix is used as a modulus. In detail, the operation unit 43 calculates a remainder vector defined by z mod V=z−[z*V$^{-1}$]*V. Note that [q] represents mapping of a fraction q rounded to the nearest integer.

Then, the operation unit 43 outputs the calculated remainder vector to the proximity determination unit 44. Note that, for each remainder vector, the operation unit 43 notifies the proximity determination unit 44 of which information providing device provides, together with the terminal device 3, a concealed vector associated with the remainder vector.

The proximity determination unit 44 determines whether the last element of each remainder vector received from the operation unit 43 is equal to zero. If the last element of the remainder vector is equal to zero, the proximity determination unit 44 determines that the sending source and the terminal device 3 of concealed vectors associated with the remainder vector belong to the proximity range. Then, the proximity determination unit 44 notifies the determination result output unit 45 of the information providing device determined to belong to the proximity range of the terminal device 3.

For example, if the last element of the remainder vector calculated from the difference vector between the concealed vector of the terminal device 3 and the concealed vector of the information providing device 4 is equal to zero, the proximity determination unit 44 determines that the information providing device 4 is located in proximity to the terminal device 3. Then, the proximity determination unit 44 notifies the determination result output unit 45 of the information providing device 4.

In contrast, if the last element of the remainder vector calculated from the difference vector between the concealed vector of the terminal device 3 and the concealed vector of the information providing device 4 is not equal to zero, the proximity determination unit 44 determines that the information providing device 4 is not located in proximity to the terminal device 3. Additionally, if the proximity determination unit 44 determines that the last elements of all the remainder vectors have values other than zero, and all the information providing devices 4 to 6 are not located in proximity to the terminal device 3, the proximity determination unit 44 outputs, to the determination result output unit 45, something to the effect that there is no information providing device located in the proximity range of the terminal device 3.

When outputting a determination result to the terminal device 3, the determination result output unit 45 notifies the terminal device 3, through the Internet 8, of an information providing device notified from the proximity determination unit 44, that is, an information providing device located in proximity to the terminal device 3. Note that, when outputting a determination result to each of the information providing devices 4 to 6, the determination result output unit 45 notifies an information providing device notified from the proximity determination device 44, through the Internet 8, of information on the terminal device 3.

Note that when the receiving unit 40 has received a request for proximity determination from the terminal device 3, the proximity determination server 7 sends, to the key generation server 2, a notification to the effect that the request for proximity determination has been received, thereby causing linear combinations to be distributed from the key generation server 2 to the terminal device 3 and each of the information providing devices 4 to 6. Then, the proximity determination server 7 receives concealed vectors that have been concealed using random numbers different from each other and linear combinations different from each other from the terminal device 3 and each of the information providing devices 4 to 6, and carries out a proximity determination using the received concealed vectors.

Figure 7:
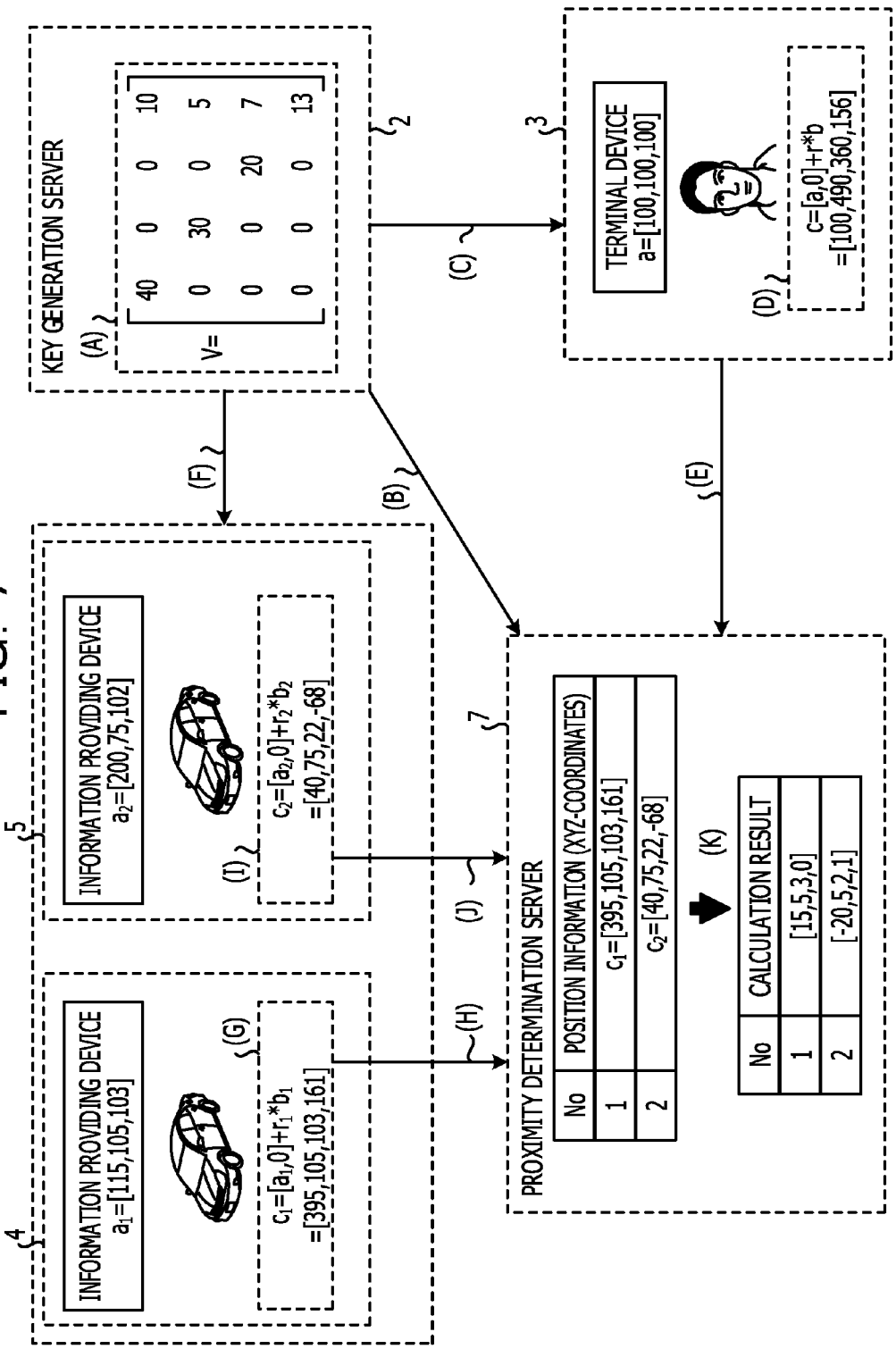
FIG. 7 is a block diagram illustrating an example of a process performed by the proximity determination system.

With reference to FIG. 7, a specific example of a process performed by a proximity determination system will be described next. FIG. 7 is a block diagram illustrating an example of the process performed by the proximity determination system. Note that, in the example illustrated in FIG. 7, it is assumed that the terminal device 3 is a terminal device of the user who searches for a taxi vehicle located in the proximity thereto, and the information providing devices 4 and 5 are mounted in taxi vehicles.

Also, in the example illustrated in FIG. 7, it is assumed that the terminal device 3 and the information providing devices 4 and 5 use three-dimensional information as the position information. For example, in the example illustrated in FIG. 7, it is assumed that position information a of the terminal device 3 is [100, 100, 100], position information $a_1$ of the information providing device 4 is [115, 105, 103], and position information $a_2$ of the information providing device 5 is [200, 75, 102].

First, the key generation server 2 generates a key matrix V illustrated at (A) of FIG. 7. In particular, the key generation server 2 generates the 4×4 key matrix V in which the fourth row 0, 0, 0 is added to a 3×3 diagonal matrix in which thresholds 40, 30, 20 are diagonal elements, and further a random number vector 10, 5, 7, 13 is added as the fourth column. Then, as illustrated at (B) of FIG. 7, the key generation server 2 sends the key matrix V to the proximity determination server 7.

Also, the key generation server 2 generates linear combinations to be distributed to the terminal device 3 and the information providing devices 4 and 5, from the key matrix V. For example, the key generation server 2 regards row vectors of the key matrix as $v_1$ to $v_4$, and calculates a linear combination b=[0, 30, 20, 12], which is the sum of $v_2$ and $v_3$. Then, as illustrated at (C) of FIG. 7, the key generation server 2 outputs the linear combination b=[0, 30, 20, 12] to the terminal device 3.

In such a case, the terminal device 3 selects a random number r=13, and calculates a concealed vector c=[a, 0]+r*b=[100, 490, 360, 156] as illustrated at (D) of FIG. 7 from the position information a, the linear combination b, and the random number r. Then, as illustrated at (E) of FIG. 7, the terminal device 3 sends the calculated concealed vector c=[100, 490, 360, 156] to the proximity determination server 7.

In contrast, the key generation server 2 calculates a linear combination $b_1$=[40, 0, 0, 23], which is the sum of the row vectors $v_1$ and $v_4$ of the key matrix V, and calculates a linear combination $b_2$=[40, 0, 20, 17], which is the sum of the row vectors $v_1$ and $v_3$. Then, as illustrated at (F) of FIG. 7, the key generation server 2 distributes the linear combination $b_1$ to the information providing device 4, and distributes the linear combination $b_2$ to the information providing device 5.

In such a case, the information providing device 4 selects a random number $r_1$=7, and calculates a concealed vector $c_1$= [$a_1$, 0]+$r_1$*$b_1$=[395, 105, 103, 161] from the position information $a_1$, the linear combination $b_1$, and the random number $r_1$ as illustrated at (G) of FIG. 7. Then, as illustrated at (H) of FIG. 7, the information providing device 4 sends the calculated concealed vector $c_1$=[395, 105, 103, 161] to the proximity determination server 7.

Also, the information providing device 5 selects a random number $r_2$=−4, and calculates a concealed vector $c_2$=[$a_2$, 0]+$r_2$*$b_2$=[40, 75, 22, −68] as illustrated at (I) of FIG. 7 from the position information $a_2$, the linear combination $b_2$, and the random number $r_2$. Then, as illustrated at (J) of FIG. 7, the information providing device 5 sends the calculated concealed vector $c_2$=[40, 75, 22, −68] to the proximity determination server 7.

In such a case, as illustrated at (K) of FIG. 7, the proximity determination server 7 calculates a remainder vector, with the key matrix used as a modulus, from a difference vector z1 between the concealed vector $c_1$ and the concealed vector c and a difference vector $z_2$ between the concealed vector $c_2$ and the concealed vector c. In particular, the proximity determination server 7 calculates the difference vector z1=($c_1$−c), and calculates z1 mod V=z1−[z1*$V^{-1}$]*V=[15, 5, 3, 0]. Also, the proximity determination server 7 calculates the difference vector $z_2$=($c_2$−c), and calculates $z_2$ mod V=$z_2$−[$z_2$*$V^{-1}$]*V= [−20, 5, 2, 1].

As a result, since the last element of the remainder vector calculated from the concealed vector $c_1$ is equal to zero, the proximity determination server 7 determines that the information providing device 4 is located in proximity to the terminal device 3. In contrast, since the last element of the remainder vector calculated from the concealed vector $c_2$ is not equal to zero, the proximity determination server 7 determines that the information providing device 5 is not located in proximity to the terminal device 3. Then, the proximity determination server 7 notifies the terminal device 3 of the information providing device 4, or notifies the information providing device 4 of the position of the terminal device 3, and ends the process.

Figure 8:
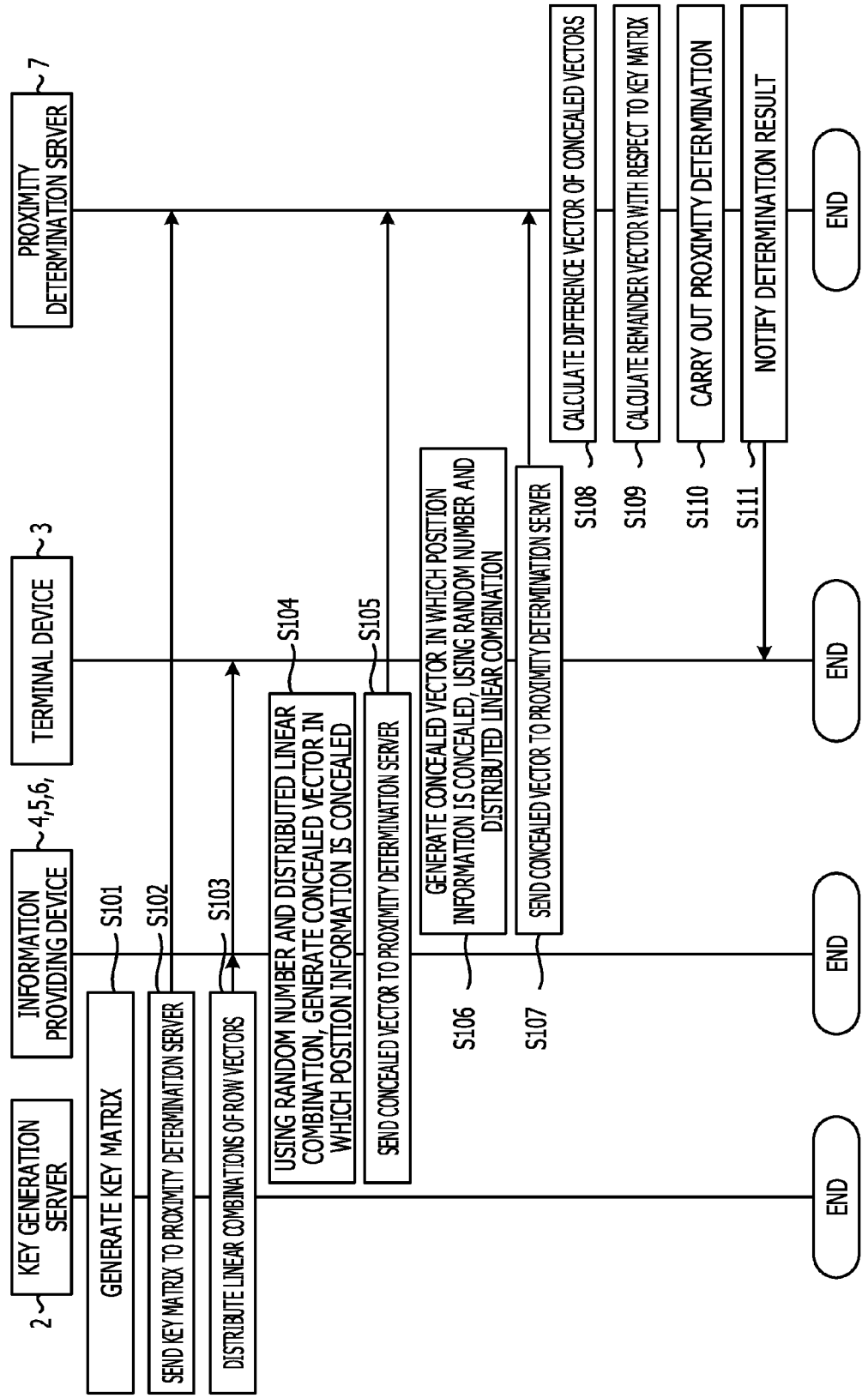
FIG. 8 is a sequence diagram for explaining the flow of a process performed by a proximity determination system according to the first embodiment.

With reference to FIG. 8, the flow of the process performed by the proximity determination system 1 will be described next. FIG. 8 is a sequence diagram for explaining the flow of the process performed by a proximity determination system according to the first embodiment. First, the key generation server 2 generates a key matrix (step S101), and sends the key matrix to the proximity determination server 7 (step S102).

Then, the key generation server 2 generates linear combinations of row vectors from the key matrix, and distributes the generated linear combinations to each of the information providing devices 4 to 6 and the terminal device 3 (step S103). Then, using a random number and the distributed linear combination, each of the information providing devices 4 to 6 generates a concealed vector in which position information is concealed (step S104). Then, each of the information providing devices 4 to 6 sends the generated concealed vector to the proximity determination server 7 (step S105). The terminal device 3 generates a concealed vector in which position information is concealed, using a random number and the distributed linear combination (step S106). Then, the terminal device 3 sends the concealed vector to the proximity determination server 7 (step S107).

Then, the proximity determination server 7 calculates a difference vector between the concealed vector received from each of the information providing devices 4 to 6 and the concealed vector received from the terminal device 3 (step S108), and calculates a remainder vector with respect to the key matrix from the calculated difference vector (step S109). Thereafter, the proximity determination server 7 carries out a proximity determination using the calculated remainder vector (step S110), notifies the terminal device 3 of a determination result (step S111), and ends the process.

[Effects of Proximity Determination Server 7]

As described above, the proximity determination server 7 collects a concealed vector based on a linear combination of row vectors of a key matrix, position information of the terminal device 3, and a random number generated by the terminal device 3. The key matrix is generated by adding random numbers as the last column to a matrix in which thresholds for determining a proximity range are diagonal elements. The proximity determination server 7 also collects a concealed vector based on a linear combination of row vectors of the key matrix, position information of each of the information providing devices 4 to 6, and a random number generated by each of the information providing devices 4 to 6.

Then, the proximity determination server 7 calculates a remainder vector, which is a remainder from the difference between the concealed vector collected from the terminal device 3 and the concealed vector collected from each of the information providing devices 4 to 6 when the key matrix is used as a modulus. Thereafter, based on the calculated remainder vector, the proximity determination server 7 determines whether the position of the terminal device 3 and the position of each of the information providing devices 4 to 6 belong to the proximity range.

In this way, the terminal device 3 and each of the information providing devices 4 to 6 conceal their pieces of position information using random numbers generated by themselves, respectively. In such a case, the random number for concealment differs for every pieces of position information that has been sent. Therefore, even when the concealed position information leaks out to another device, it is difficult to perform the inverse operation for the position information used as the base. For this reason, the proximity determination server 7 may carry out a proximity determination while keeping the pieces of position information of the terminal device 3 and each of the information providing devices 4 to 6 concealed from other devices.

Also, the proximity determination server 7 collects pieces of position information concealed using the linear combinations of the row vectors of a key matrix and random numbers generated by the terminal device 3 and each of the information providing devices 4 to 6, and calculates a remainder vector, which is a remainder from a difference between the pieces of concealed position information when the key matrix is used as a modulus. Then, based on elements of the remainder vector, the proximity determination server 7 determines whether the position of the terminal device 3 and the position of each of the information providing devices 4 to 6 belong to the proximity range. For this reason, the proximity determination server 7 may carry out a proximity determination while keeping pieces of position information concealed even when the pieces of position information are concealed with random numbers that differ from one another.

Also, the proximity determination server 7 collects pieces of position information concealed with linear combinations that differ from one another. For this reason, the proximity determination server 7 may alleviate the decipherment difficulty of the concealed position information.

Also, the proximity determination server 7 collects, from the terminal device 3, a concealed vector obtained by adding the position information of the terminal device 3 to the product of a linear combination of the key matrix and a random number selected by the terminal device 3. Also, the proximity determination server 7 collects, from each of the information providing devices 4 to 6, a concealed vector obtained by adding the position information of each of the information providing devices 4 to 6 to the product of a linear combination of the key matrix and a random number selected by each of the information providing devices 4 to 6. For this reason, the proximity determination server 7 may carry out a proximity determination while keeping the position information of the terminal device 3 and the position information of each of the information providing devices 4 to 6 concealed.

Second Embodiment

Although the embodiment of the present disclosure has been described, the present disclosure may be carried out in various forms other than the above embodiment. Accordingly, another embodiment included in the present disclosure will be described as a second embodiment below.

(1) Key Matrix

The key generation server 2 described above generates a key matrix using a diagonal matrix in which position information is diagonal elements used as thresholds serving as a proximity range. The embodiments, however, are not limited to this. That is, the key generation server 2 may use any information used for proximity determination as the thresholds. For example, the key generation server 2 may generate a key matrix using a diagonal matrix in which four-dimensional thresholds obtained by adding time information to position information are diagonal elements. In such a case, when a time point at which the terminal device 3 acquires position information and a time point at which each of the information providing devices 4 to 6 acquires position information are within a predetermined range, the proximity determination server 7 will carry out a determination to the effect that the terminal device 3 and each of the information providing devices 4 to 6 belong to the proximity range.

Note that the key generation server 2 may use not only information in the xyz-axes directions but also any feature amounts, determination amounts, and other numerical values for determining whether the terminal device 3 and each of the information providing devices 4 to 6 belong to the proximity range, including the latitude, longitude, and time, as the contents of the key matrix.

(2) Proximity Determination

The proximity determination server 7 described above determines whether the terminal device 3 and each of the information providing devices 4 to 6 belong to the proximity range, depending on whether the last element of a remainder vector is equal to zero. The embodiments, however, are not limited to this. For example, the proximity determination server 7 may be able to carry out a proximity determination using not only the last element of a remainder vector but also any number of elements.

For example, the key generation server 2 generates an (m+u)×m matrix by adding u row vectors in which each element is equal to zero, as determination elements, to an m×m square matrix in which thresholds are diagonal elements. Here, u is an arbitrary natural number. Also, the key generation server 2 generates u random number vectors of m+u dimensions, and adding the u generated random number vectors as (m+1)th to (m+u)th column vectors to the (m+u)×m matrix, thereby generating an (m+u)×(m+u) key matrix V. Also, the terminal device 3 and each of the information providing devices 4 to 6 generate m+u dimensional position vectors by adding u dimensions having elements equal to zero to the position information, and conceal the m+u dimensional position vectors using the linear combinations of the key matrix V and send them to the proximity determination server 7.

Then, the proximity determination server 7 acquires m+n dimensional vectors by carrying out the same process as in the first embodiment. Then, the proximity determination server 7 determines whether each of the elements from the (m+1)st dimension to the (m+u)th dimension is equal to zero, and carries out a proximity determination depending on the number of elements determined to be equal to zero. In this way, the proximity determination system 1 may carry out a proximity determination using an arbitrary number of elements. Also, the proximity determination system 1 may improve the system of a proximity determination when carrying out a proximity determination using a plurality of elements.

(3) Usage Forms

The proximity determination system 1 described above determines whether the position of the terminal device 3 and the position of each of the information providing devices 4 to 6 belong to the proximity range. The embodiments, however, are not limited to this, and the proximity determination system 1 may be applied to a system that determines whether two pieces of arbitrary information belong to the proximity range.

Figure 9:
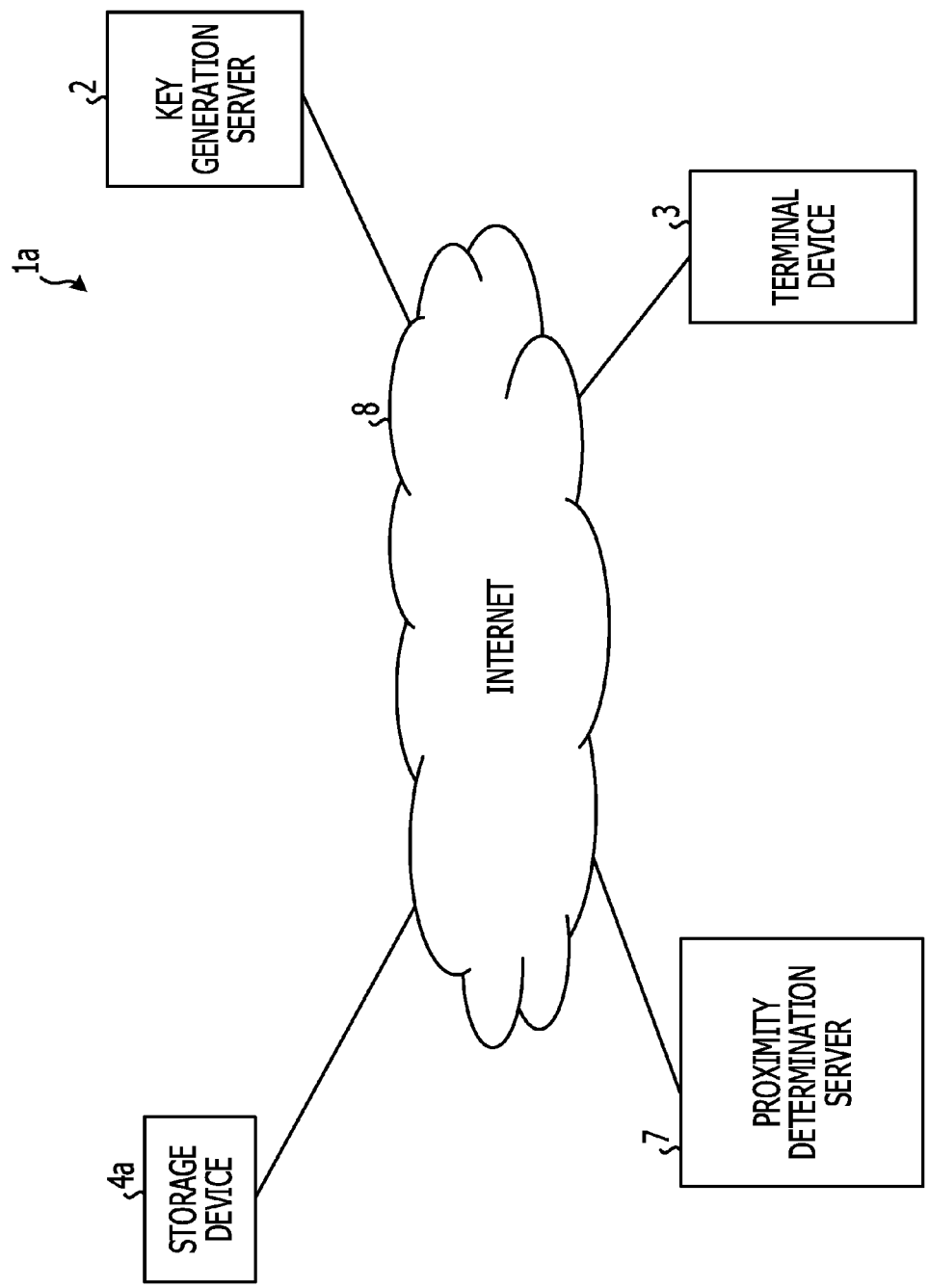
FIG. 9 is a block diagram illustrating an example of a biometric authentication system.

For example, FIG. 9 is a block diagram illustrating an example of a biometric authentication system. As illustrated in FIG. 9, a biometric authentication system is includes the key generation server 2, the terminal device 3, a storage device 4a, the proximity determination server 7, and the Internet 8. For example, the proximity determination system 1 acquires in advance a feature amount vector extracted from biometric information, such as the user's fingerprint and vein, and stores the acquired feature amount vector in the storage device 4a on a network.

Also, the key generation server 2 generates a key matrix from a diagonal matrix in which thresholds for elements allowable as a proximity range of the feature amount vector are diagonal elements. Then, the key generation server 2 sends the key matrix to the proximity determination server 7 and outputs the linear combinations generated from row vectors of the key matrix to the terminal device 3 and the storage device 4a.

In such a case, the terminal device 3 extracts a feature amount vector from the user's fingerprint and vein, conceals the extracted feature amount vector in the same way as in the first embodiment, and sends the concealed feature amount vector to the proximity determination server 7. Also, the storage device 4a conceals the user's registered feature amount vector using the same process as the information providing device 4, and sends the concealed feature amount vector to the proximity determination server 7. Thereafter, the proximity determination server 7 carries out the same process as in the first embodiment. Thus, the proximity determination server 7 may carry out a proximity determination while keeping the user's feature amount vectors concealed.

Also, the proximity determination system 1 and the biometric authentication system 1a may carry out not only the above proximity determination of position information and feature amount vectors used for biometric authentication but also a concealment similarity determination between confidential texts. For example, the storage device 4a extracts a character and text portion having a feature from a confidential text, and converts it into a feature amount vector indicating the feature amount of the extracted portion. Then, the terminal device 3 extracts a character and text portion having a feature from a text to be determined, and acquires a feature amount vector indicating the extracted portion.

Thereafter, the terminal device 3 and the storage device 4a output the feature amount vectors concealed by the same process as in the first embodiment to the proximity determination server 7. As a result, the proximity determination server 7 may carry out a similarity determination while keeping the specific content of a confidential text or a text being determined concealed.

Also, the proximity determination system 1 may carry out a position determination of a concealed IP address in a network monitoring service. For example, the IP address of an information processing device connected to the proximity determination system 1 is stored in the information providing device 4. When a fault arises in such an information processing device, the information processing device conceals the IP address and outputs the concealed IP address to the proximity determination server 7. Then, the proximity determination server 7 collects the concealed IP address of each information processing device from the information providing device 4, and thus the proximity determination server 7 may identify an information processing device in which the fault has arisen.

As described above, the proximity determination system 1 may carry out a proximity determination not only for position information but also for any information, such as biometric authentication, a concealment similarity determination between confidential texts, and a concealed IP address matching determination. Note that although the number of dimensions and values of thresholds used at the time of generating key information varies depending on the kind of information handled by the proximity determination system 1, the proximity determination system 1 may carry out a proximity determination for any number of dimensions and values in the same process as in the first embodiment.

(4) Clouds

In the first embodiment described above, the example in which the key generation server 2, the terminal device 3, the information providing device 4, and the proximity determination server 7 are connected through the Internet 8. The embodiments, however, are not limited to this, and the key generation server 2 and the proximity determination server 7 may be implemented by what is called a cloud system, for example.

That is, the key generation server 2 may be implemented in such a way that a plurality of information processing devices set on a network perform the processing of the vector storage unit 10, the random number generation unit 11, the key matrix generation unit 12, and the linear combination generation unit 13 illustrated in FIG. 2. Also, the proximity determination server 7 may be implemented in such a way that a plurality of information processing devices set on a network perform the processing of the receiving unit 40, the concealed position information storage unit 41, the key matrix storage unit 42, the operation unit 43, the proximity determination unit 44, and the determination result output unit 45 illustrated in FIG. 6.

(5) Information Sent by Terminal Device

In the first embodiment described above, the process in which the terminal device 3 conceals information on its position, and transmits the concealed position information to the proximity determination server 7. The embodiments, however, are not limited to this. For example, the terminal device 3 may be a terminal device set by a taxi company, acquire the position of a user who has requested the call of a taxi vehicle, and conceal the user's position acquired and output the concealed position to the proximity determination server 7. In such a case, the terminal device 3 is able to identify a taxi vehicle located in proximity to the user and allocate the identified taxi vehicle to the user.

(6) Programs

Various kinds of processes described in the above embodiment may be implemented by executing a program prepared in advance on a computer such as a personal computer or a workstation. Accordingly, with reference to FIG. 10, an example of a computer that executes a proximity determination program having the same functions as in the above embodiment will be described below.

Figure 10:
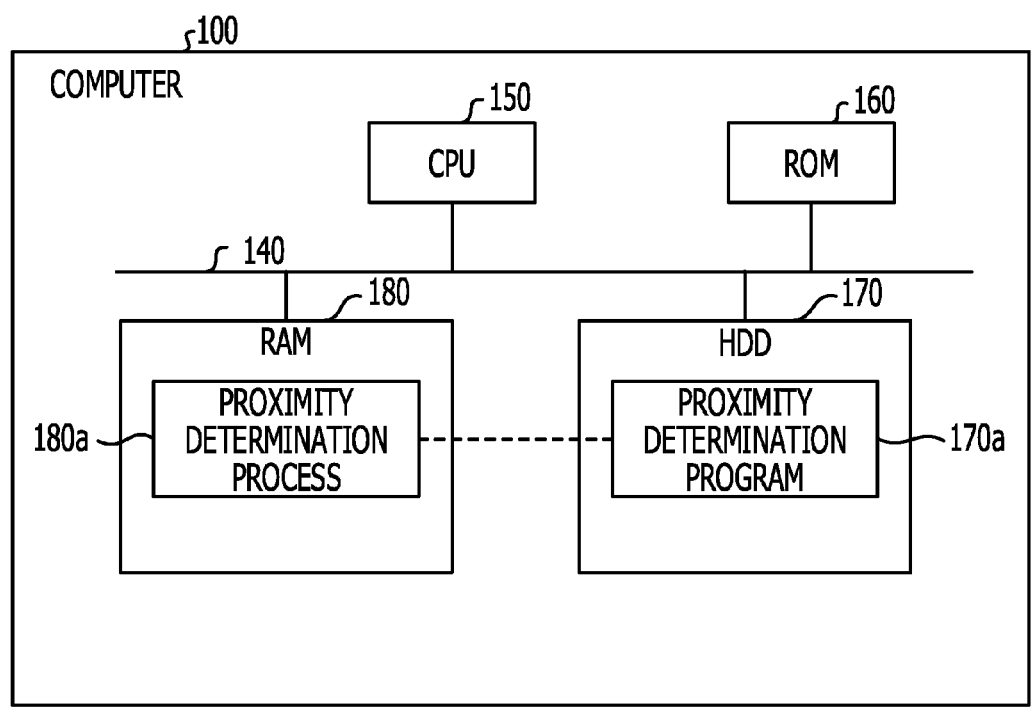
FIG. 10 is a block diagram for explaining an example of a computer that executes a proximity determination program.

FIG. 10 is a block diagram for explaining an example of a computer that executes a proximity determination program. As illustrated in FIG. 10, a computer 100 includes a central processing unit (CPU) 150 and a read only memory (ROM) 160, a hard disk drive (HDD) 170, and a random access memory (RAM) 180. These elements 110 to 180 are connected through a bus 140.

A proximity determination program 170a that exhibits the same functions as the proximity determination device 20 is stored in advance in the HDD 170. The proximity determination program 170a may be appropriately integrated or separated as in the case of elements illustrated in the first embodiment. That is, all of the data stored in the HDD 170 does not have to be stored in the HDD 170 at all times, and only data used for processes has to be stored in the HDD 170.

Then, the CPU 150 reads the proximity determination program 170a from the HDD 170 and develops it in the RAM 180. This causes the proximity determination program 170a to function as a proximity determination process 180a as illustrated in FIG. 10. The proximity determination process 180a appropriately develops various kinds of data read from the HDD 170 in a region assigned thereto on the RAM 180, and performs various kinds of processes based on various kinds of developed data.

Note that the proximity determination process 180*a* includes processes performed by the receiving unit 40, the operation unit 43, the proximity determination unit 44, and the determination result output unit 45. Also, all of the processing units virtually implemented on the CPU 150 do not have to operate on the CPU 150 at all times, and only the processing units used for processes may be virtually implemented.

Note that the proximity determination program 170*a* mentioned above does not have to be stored in the HDD 170 or the ROM 160 from the beginning. For example, programs are stored in what is called "portable physical media" such as a flexible disk (FD), a compact disk (CD)-ROM, a digital video disk (DVD), a magneto-optical disc, and an IC card to be inserted in the computer 100.

Then, the computer 100 may acquire programs from these portable physical media and execute the programs. Additionally, programs are stored in other computers or server devices connected to the computer 100 through a public network, the Internet, a local area network (LAN), a wide area network (WAN), or the like, and the computer 100 may acquire the programs from them and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A proximity determination method that is executed by a computer, the proximity determination method comprising:
    collecting a first concealed vector based on a linear combination of a row vector of a key matrix, first numerical information, and a first random number, the key matrix being generated by adding a random number vector as a last column to a matrix in which a threshold for determining a proximity range is a diagonal element;
    collecting a second concealed vector based on the linear combination, second numerical information, and a second random number;
    collecting a third concealed vector based on another linear combination that is different from the linear combination, the second numerical information, and the second random number;
    calculating a remainder vector, which is a remainder using the key matrix as a modulus based on a difference between the collected first concealed vector and the second concealed vector; and
    determining, by the computer, whether the first numerical information and the second numerical information belong to the proximity range, based on the calculated remainder vector.

2. The proximity determination method according to claim 1,
    wherein the first concealed vector has a value obtained by adding the first numerical information to a product of the linear combination and the first random number, and
    wherein the second concealed vector has a value obtained by adding the second numerical information to a product of the linear combination and the second random number.

3. The proximity determination method according to claim 1,
    wherein the first numerical information indicates a position of a first information processing device, and
    wherein the second numerical information indicates a position of a second information processing device.

4. The proximity determination method according to claim 1, wherein the computer determines that the first numerical information and the second numerical information belong to the proximity range when a last element of the calculated remainder vector is equal to zero.

5. The proximity determination method according to claim 1, wherein the key matrix is generated by:
    generating a m-by-m diagonal matrix, where m represents a number of elements in positional information used for determining the proximity range and a diagonal of the m-by-m matrix contains the thresholds for determining the proximity range for each of the m elements;
    generating an n-by-m matrix by adding a last row with all elements equal to zero to the generated m-by-m diagonal matrix, where n=m+1; and
    generating the key matrix as an n-by-n square matrix by adding the random number vector as the last column to the generated n-by-m matrix.

6. A proximity determination device comprising:
    a memory; and
    a processor coupled to the memory and configured to
        collect a first concealed vector based on a linear combination of a row vector of a key matrix, first numerical information, and a first random number, the key matrix being generated by adding a random number vector as a last column to a matrix in which a threshold for determining a proximity range is a diagonal element;
        collect a second concealed vector based on the linear combination, second numerical information, and a second random number;
        collect a third concealed vector based on another linear combination that is different from the linear combination, the second numerical information, and the second random number;
        calculate a remainder vector, which is a remainder using the key matrix as a modulus based on a difference between the collected first concealed vector and the second concealed vector; and
        determine whether the first numerical information and the second numerical information belong to the proximity range, based on the calculated remainder vector.

7. The proximity determination device according to claim 6,
    wherein the first concealed vector has a value obtained by adding the first numerical information to a product of the linear combination and the first random number, and
    wherein the second concealed vector has a value obtained by adding the second numerical information to a product of the linear combination and the second random number.

8. The proximity determination device according to claim 6,
    wherein the first numerical information indicates a position of a first information processing device, and
    wherein the second numerical information indicates a position of a second information processing device.

9. The proximity determination device according to claim 6, wherein the processor determines that the first numerical information and the second numerical information belong to the proximity range when a last element of the calculated remainder vector is equal to zero.

10. The proximity determination device according to claim 6, wherein the key matrix is generated by:
generating a m-by-m diagonal matrix, where m represents a number of elements in positional information used for determining the proximity range and a diagonal of the m-by-m matrix contains the thresholds for determining the proximity range for each of the m elements;
generating an n-by-m matrix by adding a last row with all elements equal to zero to the generated m-by-m diagonal matrix, where n=m+1; and
generating the key matrix as an n-by-n square matrix by adding the random number vector as the last column to the generated n-by-m matrix.

11. A proximity determination system comprising:
a key matrix generation device including a first memory and a first processor, wherein the first processor is coupled to the first memory and configured to:
generate a key matrix, the key matrix being generated by adding a random number vector as a last column to a matrix in which a threshold for determining whether first numerical information stored in a first information processing device and second numerical information stored in a second information processing device belong to a proximity range is a diagonal element,
send a linear combination of a row vector of the key matrix to the first information processing device and the second information processing device, and
send the key matrix; and
a proximity determination device including a second memory and a second processor, wherein the second processor is coupled to the second memory and configured to:
receive the key matrix from the key matrix generation device,
collect a first concealed vector from the first information processing device based on the linear combination, the first numerical information, and a first random number,
collect a second concealed vector from the second information processing device based on the linear combination, the second numerical information, and a second random number,
calculate a remainder vector, which is a remainder using the key matrix as a modulus based on a difference between the first concealed vector and the second concealed vector, and
determine whether the first numerical information and the second numerical information belong to the proximity range, based on the remainder vector.

12. The proximity determination system according to claim 11, the second processor is further configured to collect a third concealed vector based on another linear combination that is different from the linear combination, the second numerical information, and the second random number.

13. The proximity determination system according to claim 11,
wherein the first concealed vector has a value obtained by adding the first numerical information to a product of the linear combination and the first random number, and
wherein the second concealed vector has a value obtained by adding the second numerical information to a product of the linear combination and the second random number.

14. The proximity determination system according to claim 11,
wherein the first numerical information indicates a position of the first information processing device, and
wherein the second numerical information indicates a position of the second information processing device.

15. The proximity determination system according to claim 11, wherein the second processor determines that the first numerical information and the second numerical information belong to the proximity range when a last element of the calculated remainder vector is equal to zero.

16. The proximity determination system according to claim 11, wherein the key matrix is generated by:
generating a m-by-m diagonal matrix, where m represents a number of elements in positional information used for determining the proximity range and a diagonal of the m-by-m matrix contains the thresholds for determining the proximity range for each of the m elements;
generating an n-by-m matrix by adding a last row with all elements equal to zero to the generated m-by-m diagonal matrix, where n=m+1; and
generating the key matrix as an n-by-n square matrix by adding the random number vector as the last column to the generated n-by-m matrix.

* * * * *